Nov. 9, 1971   J. SUNNEN   3,618,268
STROKE POSITION CONTROL MEANS
Filed Sept. 4, 1969   6 Sheets-Sheet 3

INVENTOR
JOSEPH SUNNEN
BY Charles B. Haverstock
ATTORNEY.

United States Patent Office 3,618,268
Patented Nov. 9, 1971

3,618,268
STROKE POSITION CONTROL MEANS
Joseph Sunnen, 400 S. Warson Road, Ladue, Mo. 63124
Filed Sept. 4, 1969, Ser. No. 855,212
Int. Cl. B24b 49/16
U.S. Cl. 51—165 R
15 Claims

ABSTRACT OF THE DISCLOSURE

An apparatus for adjusting by shifting the position of reciprocation of a reciprocating member relative to a stationary member, such as by shifting the position of a rotating and/or reciprocating working member or of a workpiece being honed thereby to correct for inaccuracies in the surface being honed. The subject apparatus includes means for sensing the instantaneous load and changes therein required to to rotate the honing head and for producing therefrom control signals which are used to indicate and/or to operate means that shift or relocate the position of the stroke pattern of one member relative to the other in a direction to compensate for load variations sensed and to correct the inaccuracies that caused the load to vary.

---

The present invention relates generally to control means for working members such as honing devices and the like and more particularly to means for controlling by relocating the position of a stroking pattern relative to a workpiece without in any other way altering or changing the stroking pattern, said stroke pattern being shifted in a direction to correct for inaccuracies in a surface being worked on.

It is well known to provide means for moving or reciprocating a stroking working member such as a honing head while it is rotatingly engaged with a workpiece in order to work on or hone all portions of a surface to some predetermined size or dimension. Various stroke and stroke control means have been devised for this purpose and some have even included load sensing means which for the most part operate to alter or change stroke pattern in some way to correct for inaccuracies. Such devices have included manual as well as automatic compensation means. For example, there are known means which sense load and operate to change the stroking rate during certain portions of a stroke cycle. For instance, an increase in load might be used to slow a stroke rate to increase the time of contact between the working member and the workpiece. The same principle can also be used to vary the speed of rotation of the working member to produce greater contact with certain portions of the workpiece at locations where increased load or driving force is sensed. Devices such as these are covered by applicant's own prior U.S. Letters Pat. No. 3,009,446 and 3,451,175. These and other means and methods for correcting inaccuracies have merit and are suitable for some applications but not for others. The known means for correcting inaccuracies are especially limited when using relatively short length rapid strokes.

This application describes another way of making corrections which has the advantage of not requiring any change in an established stroke pattern or any change in the speed of rotation of the rotating work member, or workpiece, and yet provides means for accurately and precisely correcting imperfections which are sensed as by using some type of known load sensing means such as means responsive to load current, belt tension, torque responsive means and so forth as well as inaccuracies sensed by workpiece gaging means used during a honing operation or at some other time. The present means are also particularly suited to applications where short rapid strokes are used.

The limitations and shortcomings of known stroke producing and stroke control means are overcome in large measure by the present invention which teaches the construction and operation of relatively simple yet effective means for sensing inaccuracies as by sensing load current or the like or measuring or gaging the workpiece surface, and using the information obtained to make corrections by shifting the position of the stroke pattern without otherwise effecting any change in the basic pattern of reciprocation or stroke and without changing the rotational speed of the rotated member. This is accomplished with the present device by means which shift or relocate the stroking pattern of a stroking member relative to a nonstroking or stationary member in response to sensed variations in the force required to rotate the rotated member or variations measured in the workpiece surface, and in a direction to correct the imperfections so that the stroke pattern can revert or be returned to a preestablished position in which the load remains relatively unvarying at all times. The present device includes means for accomplishing this manually or automatically with a high degree of precision and accuracy.

It is therefore a principal object of the present invention to provide means for producing more nearly perfectly honed surfaces.

Another object is to provide means for relocating a stroking pattern of a reciprocating member relative to a nonreciprocating member to correct for inaccuracies that are sensed or otherwise detected or measured.

Another object is to provide means for shifting the location of a stroke pattern relative to a workpiece in response to load sensed by load sensing means.

Another object is to provide means for controlling the location of a stroke pattern relative to a workpiece to correct for imperfections without otherwise altering or modifying the basic stroke pattern.

Another object is to improve the wear characteristics of honing stones and other similar work engaging elements.

Another object is to provide means to enable persons having relatively little skill and training to produce more nearly perfectly honed surfaces.

Another object is to provide means for automatically and accurately simulating the sensing and corrective actions that would otherwise be made by an operator holding and moving a workpiece during honing thereof so as to remove high spots and other imperfections that he senses.

Another object is to provide relatively simple and inexpensive means that can be used to perfect surfaces of workpieces while they are being honed by a rotating and reciprocating working member.

Another object is to provide means for automatically shifting a stroke pattern between relatively movable members in a direction to equalize the load between the members in all positions thereof without otherwise varying or modifying the stroke pattern.

Another object is to modify a honing condition produced by a rotating and reciprocating honing mandrel while the mandrel is engaged with a workpiece without changing the speed of rotation, the stroke pattern or the stroking speed.

Another object is to provide means which are particularly suitable for improving the honing accuracy when honing in relatively short length bores.

Another object is to hone with more accuracy using short length rapid strokes.

Another object is to provide means for improving the honing accuracy of honing machines and the like, which means can be installed as original equipment or added as an improvement to an existing machine with a minimum of change or modification.

Another object is to provide means for changing the operating relationship between a surface on a work-piece being honed and a honing device, which means can be used to shift the position of the workpiece, the working member, the drive means for the working member, or the drive means for the workpiece.

These and other objects and advantages of the present invention will become apparent after considering the following detailed specification which covers a preferred embodiment of the subject device in conjunction with the accompanying drawings wherein:

Figure 1:
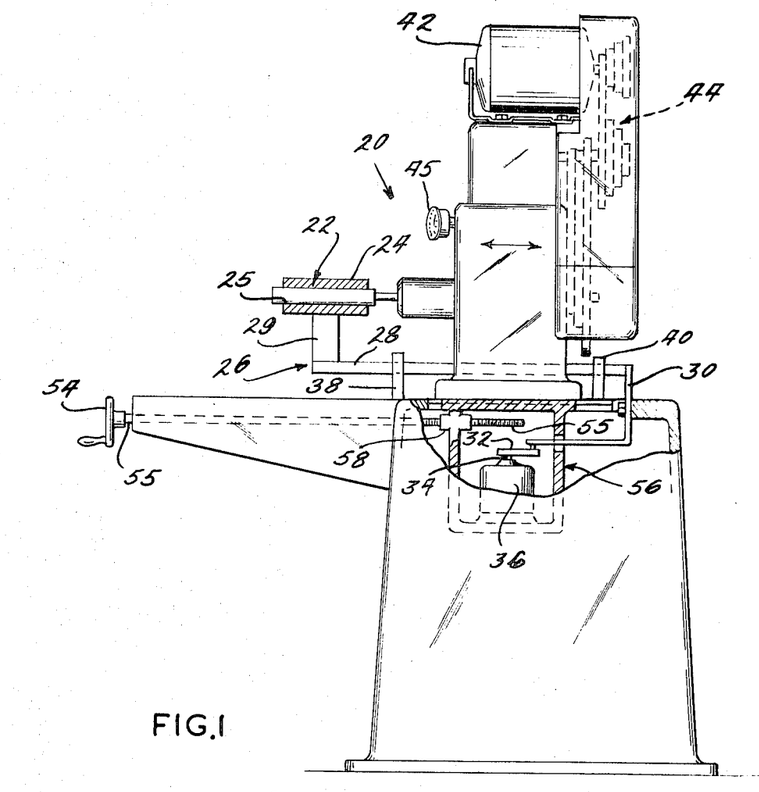
FIG. 1 is a side elevational view of a honing machine provided with manual means for adjusting or relocating the position of a stroke pattern relative to the honing means.

Referring to the drawings more particularly by reference numbers, number 20 in FIG. 1 refers generally to a honing machine equipped with means for simultaneously rotating and reciprocating a honing mandrel 22 while the mandrel is engaged with a workpiece 24 during honing of a cylindrical surface 25 therein. The subject invention resides in means operable manually or automatically to shift the position of the stroke pattern relative to the workpiece either by shifting the position of the workpiece or of the honing machine including the mandrel without otherwise changing the basic stroke pattern. The shifting is preferably, though not necessarily, done to the non-rotating member in a direction to increase the amount of honing that is done on portions of the workpiece surface 25 that are smaller than other portions in order to bring them to size and correct inaccuracies by making the surface more nearly perfectly cylindrical from end to end. The subject control means can be used in several different ways including shifting the stroke pattern of the working member or mandrel relative to the workpiece, shifting the workpiece which may be held stationary or reciprocated relative to the working member, or shifting the entire honing machine including the working portion thereof relative to the workpiece. Means for accomplishing all these possibilities are disclosed in detail in this specification. The important thing, however, is that the subject means relocate the stroke pattern without altering it and without changing the speed or rotation of the rotating member. By being able to do this it is therefore possible to correct imperfections. This is particularly difficult to accomplish by any known means which vary the stroke pattern especially when the honing means are honing in relatively short length bores where the strokes are too short and too rapid to provide time to make meaningful corrections within a given cycle.

The particular embodiment shown in FIG. 1 including means for moving or shifting the position of the rotating honing mandrel 22 relative to the reciprocating workpiece 24. The basic structural and operational details of the honing machine 20 and of the mandrel 22 may be similar to those of the honing machines and mandrels disclosed in Sunnen Pats. Nos. 2,117,525, issued May 17, 1938; 2,377,588, issued June 5, 1945; 3,152,424, issued Oct. 13 1964; 2,350,969, issued June 6, 1944; 2,376,850, issued May 22, 1945; 2,376,851, issued May 22, 1945; 2,532,682, issued Dec. 5, 1950; and 2,580,328, issued Dec. 25, 1951, for example.

The structure shown in FIG. 1 has the workpiece 24 mounted on a reciprocating assembly 26 which includes a rod 28 shown connected between a workpiece support bracket 29 of the assembly 26 on which the workpiece 24 is mounted and another member 30 which is connected to be reciprocated by a rotatable crank arm 32. The crank arm 32 is rotated by the shaft 34 of a drive motor 36 so that when the motor 36 is operating it rotates the crank arm 32 and in so doing causes the assembly 26 including the workpiece 24 to reciprocate. The assembly 26 is supported and guided during reciprocation by suitable support and guide means shown as members 38 and 40. In the simplified embodiment of the device disclosed in FIG. 1, the workpiece 24 is reciprocated back and forth relative to the rotating mandrel 22 which may be of a construction such as are shown in several of the above cited Sunnen patents, for example.

During the reciprocating movements of the workpiece 24, the mandrel 22 is rotated by another drive motor 42 through associated connections which include a pulley and belt assembly indicated generally by number 44. While the mandrel 22 is rotating, the current drawn by the motor 42 is monitored by suitable monitoring means which will be described, and the amount of motor current drawn at each instant of time is displayed on a meter 45 or the like for easy viewing by the operator. The meter reading of the motor current will increase when the load on the mandrel 22 increases due to honing in an undersized portion of the cylindrical surface 25 and will decrease when the mandrel is honing in larger sized portions thereof.

Figure 10:
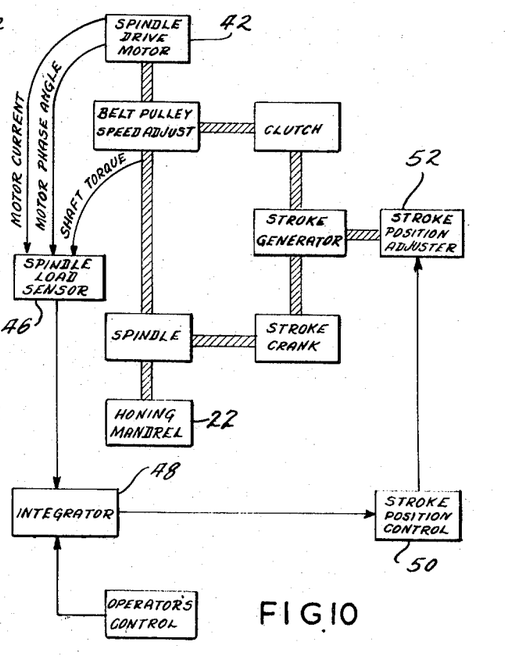
FIG. 10 is a block diagram of the drive and stroke producing means for a honing or like device including means for sensing the load on the honing device and for indicating and/or shifting the position of the stroking pattern in a direction to compensate for inaccuracies sensed by the load sensing means.

Referring to FIG. 10, which can be considered in connection with FIG. 1 as an autommatic rather than a mandrel adjustment means, it can be seen that a load sensor 46 is connected to respond to the current drawn by the motor 42. The output of the load sensor 46 is connected to an integrator circuit 48 which has its output connected to a stroke position control device 50. The device 50 is constructed as will be explained to respond to the output of the integrator 48 by shifting the position of the workpiece relative to the mandrel or vice versa in a direction to increase the amount of honing that is done on the portion of the workpiece surface 25 where the increased load is sensed. This has been done in the past when the operator has held the workpiece in his hand during honing by shifting the position of the workpiece relative to the rotating mandrel in a direction to compensate for the imperfections that he senses. A skilled operator can do this with a fairly high degree of accuracy especially when the changes in the load are relatively large, and he can continue to do this until he is satisfied that the surface is fairly uniform in diameter from one end to the other as determined by his ability to detect load differences. The obvious limitations and shortcomings of this procedure are readily apparent.

Figure 2:
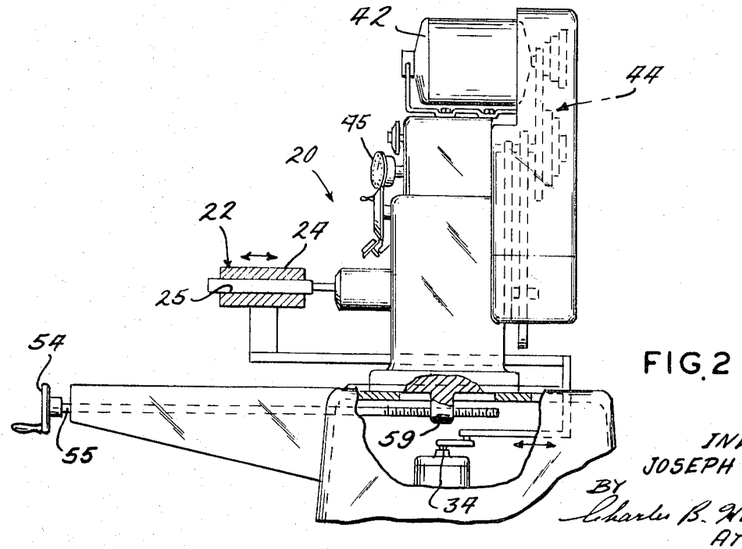
FIG. 2 is a side view similar to FIG. 1 but showing the manual adjustment means constructed to be used to adjust the position of the honing means relative to a reciprocating workpiece.

In a device such as shown in FIGS. 1 and 2, the meter 45 is an ammeter or other similar load sensing device which provides a continuous visual display of the motor current. An operator with some experience can learn to accurately read the meter and tell from this which way to move the workpiece to make a correction. This the operator can do manually by rotating a crank 54 located conveniently on the front of the machine in a direction to shift the position of the crank motor frame assembly 56, which assembly as shown includes the reciprocating assembly 26, and the workpiece 24 supported thereon but not the main portions of the honing machine. This shifting of the workpiece and of the reciprocating means associated therewith takes place relative to the rotating mandrel 22 because of a threaded connection between the shaft 55 on which the crank 54 is located and a threaded block 58 which is attached to the crank motor frame assembly 56. A similar shift is accomplished in the structure of FIG. 2 wherein the threaded block 59 is attached instead to the housing for the honing machine itself in which case the mandrel and associated drive means therefor move or shift relative to the reciprocating workpiece. In either of these cases, the correction is made manually by the operator and depends on his ability to detect differences in the ammeter readings so that he will know in which direction to turn the crank 54. The operator must also be able to tell when the correction has been completed so that he can return the stroke pattern to its centered position relative to the workpiece so as not to overcorrect the inaccuracy. It is usually relatively easy for an operator to learn to detect an imperfection in this way and to make a corresponding corrective adjustment especially if the strokes produced by the reciprocating means are relatively long and relatively slow. Also with the means described it is relatively easy for the operator to learn to sense when an inaccuracy has been corrected and to shift the stroke pattern back to a more centered position. The manual correction means disclosed in FIGS. 1 and 2 therefore represent an improvement over prior constructions including especially those where the operator is required to not only hold the workpiece but also to sense errors and make compensating movements for correction.

Figure 7:
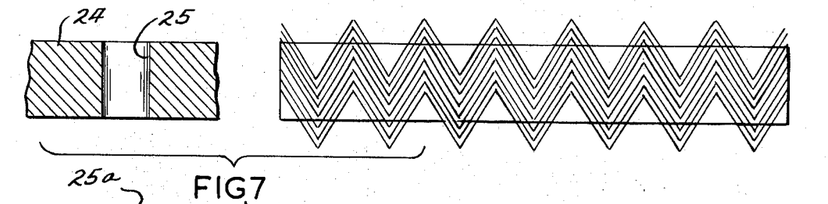
FIG. 7 is a cross-sectional view of a cylindrical hole in a workpiece to be honed, including in graphical form a representation of a typical stroking pattern of a working member used to hone the surface, said graph illustrating the reciprocating motion of the working member as a function of time.

It should also be noted in connection with FIGS. 1 and 2 that the adjustments that are made do not effect the basic pattern of reciprocation which remains unchanged throughout. This is more easily understood by referring to FIGS. 7–9. FIG. 7 shows a cylindrical bore to be honed which requires little or no correction to compensate for imperfections. In this case, the stroke pattern of the honing mandrel 22 is centered on the surface 25 and is not shifted.

Figures 8, 9:
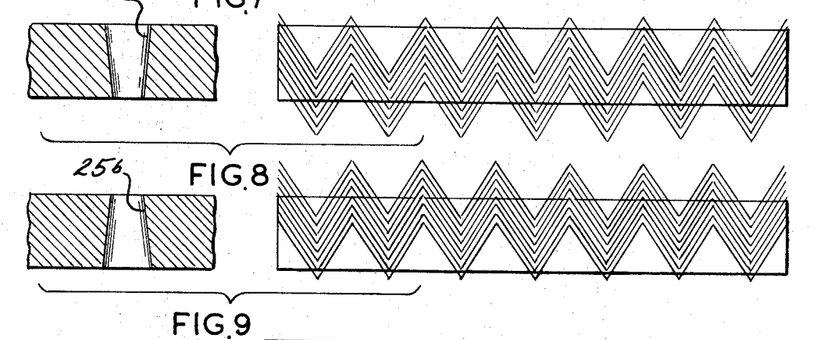
FIG. 8 is a cross-sectional view similar to FIG. 7 but showing in exaggerated form how the position of the stroke pattern is relocated to correct for an imperfect condition of the hole being honed in which the lower end of the hole is smaller in diameter than the upper end.
FIG. 9 is a cross-sectional view similar to FIG. 8 but showing how the stroke pattern is shifted when the upper instead of the lower end of the hole has the smaller diameter.

In FIG. 8 wherein the lower end of the surface 25a is shown smaller in diameter than the upper end, the lower end must be honed more than the upper end to bring the surface to a cylindrical shape. The reference to upper and lower in FIGS. 8 and 9 refers to the way the surfaces are shown therein and not necessarily to the position they are in when they are honed as evidenced by the machines of FIGS. 1 and 2. In the case shown in FIG. 8, the load sensing means or ammeter 45 would read more motor current when the mandrel is honing at the lower end of the surface 25a than at the upper end, and the operator would know to rotate the crank 54 in a direction to shift the position of the stroke pattern in the direction as shown in the drawing until the load readings return to a condition of near uniformity after which he would return the pattern to a more centered condition like that shown in FIG. 7. Similar corrections could be made by gaging or measuring the surfaces being honed and making appropriate adjustments to correct for the imperfections.

FIG. 9 shows the reverse of the condition shown in FIG. 8 wherein the upper end of surface 25b is smaller in diameter than the lower end in which case the operator would turn the crank 54 in a direction to shift the stroke pattern upwardly instead of downwardly to make the correction.

FIGS. 3–6 show in greater detail one particular construction of assembly 26 including the construction of the reciprocating work supporting means 29 and the means for reciprocating the workpiece relative to the rotating mandrel 22. As shown in FIG. 2, it is anticipated that the workpiece reciprocating means could also be used to reciprocate the honing machine including the mandrel portion thereof while the workpiece is held stationary. The workpiece holding and supporting means 29 can have many different forms including having a pedestal portion 29a and associated hinged clamping and locking means 60 for holding the workpiece thereon. Many different forms of work supporting and locking means could be used for this purpose and the particular form shown is selected only for illustrative purposes.

Figures 3, 4, 5, 6:
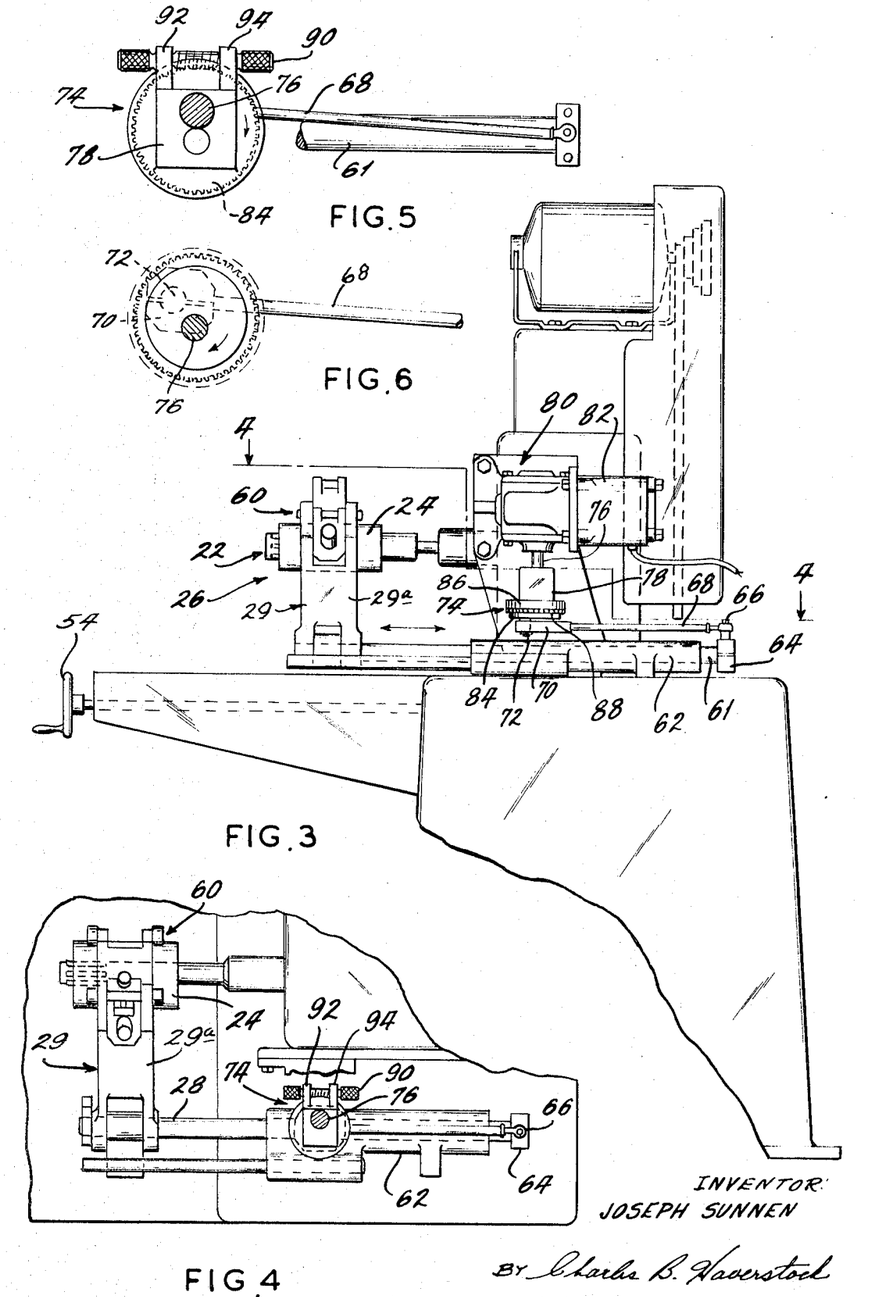
FIG. 3 is a fragmentary side elevational view showing the details of stroke and stroke positioning means constructed along the lines of the machine of FIG. 1.
FIG. 4 is a cross-sectional view taken on line 4—4 of FIG. 3.
FIG. 5 is an enlarged fragmentary view of the stroke adjustment means of FIGS. 3 and 4.
FIG. 6 is another view of the means of FIG. 5 showing the device in a different position of adjustment.

The pedestal 29a is attached to the forward end of a rod member 61, which rod corresponds to the shaft or rod 28 in FIG. 1. The rod 61 extends rearwardly through a fixed tubular member 62 and is slidable therein. The rear end of the rod 61 has a member 64 connected thereto and a stud 66 extends sidewardly from the member 64. The end portion of another rod 68 is journaled to the stud 66, and the opposite or forward end of the rod 68 is attached to another member 70 which is journaled to another stud 72 attached to a rotatable disc assembly 74. The assembly 74 is in turn attached to one end of a shaft 76, and the assembly includes a block portion 78 connected to rotate with the shaft 76. The location of the stud 72 on the disc assembly 74 relative to the axis of the shaft 76 can be varied to vary the length of movement of the rods 68 and 61 during each rotation of the assembly 74. This provides means for adjusting the stroke length of the reciprocating workpiece (or mandrel). The shaft 76 is the output shaft of a gear reducer assembly 80 and is rotated by a drive motor 82. When the shaft 76 rotates the assembly 74 it produces the reciprocating motion which is imparted through the rods 61 and 68 to the workpiece 24.

The assembly 74 is further adjustable to vary the stroke length by means which include relatively rotatable assembly portions 84 and 86. The portion 86 is fixedly attached to the rotatable block 78, and the portion 84 is adjacent to the portion 86 and includes a peripheral gear portion 88 which cooperates with an adjustable worm gear 90 jornaled by projections 92 and 94 formed on the block 78 (FIG. 5). When the worm gear member 90 is adjusted by turning one of its knurled end portions, it rotates the member 84 and its associated gear portion 88 relative to the members 78 and 86, and in so doing changes the radial distance between the axis of the stud 72 and the axis of the shaft 76. In this way, the diameter of the circular path followed by the stud 72 during rotation of the assembly 74 can be varied, and this in turn changes the distance that the rods 68 and 61 travel during each rotation of the assembly 74. As aforesaid, this also varies the distance that the workpiece moves relative to the rotating mandrel 22 which is maintained in the same location except when a corrective adjustment is made. Once the stroke length has been set it will remain fixed until changed by changing the location of the stud 72 on the assembly 74 and/or adjusting the worm gear 90. For any given operation these adjustments usually need to be made only once, and this can be accomplished quickly and accurately as part of the setup procedure.

Once the desired stroke length has been established and the other machine setup procedure completed including mounting a workpiece in position to be honed, the honing operation can be commenced. During the honing operation the operator in the case of a manually controlled machine will observe the reading on the ammeter 45 or other load indicating means, and when the reading so indicates, will rotate the crank handle 54 to shift the position of the stroke pattern relative to the workpiece to correct for inaccuracies and to try to achieve a condition in which the ammeter reading remains relatively constant at all times. An operator can, with practice, become highly skilled at making corrective adjustments, and in this way can hone extremely accurate cylindrical surfaces. It has been found, however, that it is not always the most efficient and reliable way to rely on the skill and training of the operator, and as a result further improvements can be made which will cause the corrections such as those made manually above to be made automatically without any reliance on the skill and experience of the operator. Means for accomplishing automatic correction of imperfections in a manner similar to that described above can be made in response to the load sensed on the drive motor or through some other load sensing means. The actual corrections made in the automatic means are accomplished by means similar to the manual means described above, namely by shifting the position of the stroke pattern relative to the work, but this is accomplished in the automatic setup by means which cause the shifting to take place automatically in response to load variations sensed rather than manually.

Several forms of automatic means for making corrections similar to those made by the operator as discussed above are disclosed herein. These include means responsive to the load drawn by the drive motor 42, which load will vary by increasing when honing in the smaller diameter portions of the surface being honed and decreasing in the larger diameter portions. The loads sensed during the stroking are then used to shift the position of the stroke pattern relative to the workpiece in a manner and in a direction to compensate for the load differences. One of the advantages of making the corrections automatically is that in addition to relieving the operator of this chore, it also can be done more rapidly and precisely thereby making the corrections in the least possible time and with the least possible stock removal.

FIG. 10, which has already been described briefly, discloses one of several different possibly ways of sensing the load on the honing mandrel or head including sensing the magnitude of the current drawn by the drive motor 42. The sensing means could also be made to sense the phase angle or power factor of the drive motor under different load condition and it is also possible to mechanically sense the torque on the drive shaft of the drive motor by some means such as by means which sense the tension on the tight side of the motor drive belt and so on. This discloure will describe severals different form of load sensing means for illustrative but not limiting purposes. In FIG. 10, the motor current and/or phase angle is sensed by the sensing means 46 which are shown having outputs connected to integrator circiut 48 which in turn feeds its outputs to a stroke position control 50 that operates stroke position adjustment means shown as motor 52 to rotate means such as to rotate the crank 54 and its shaft 55. The motor 52 can be a servo type motor, an hydraulic piston type device, or it can be an ordinary electric motor. In the embodiment of FIG. 10 the stroke shifting means are shown for illustrative purposes constructed to shift the position of the honing mandrel and the associated stroking means relative to a fixed position workpiece. This construction is especially useful when honing surfaces in members such as engine blocks and the like. This is similar to some extent to the construction shown in FIG. 2 but differs therefrom because in the FIG. 10 embodiment the mandrel, not the workpiece is the reciprocated member.

Figure 11:
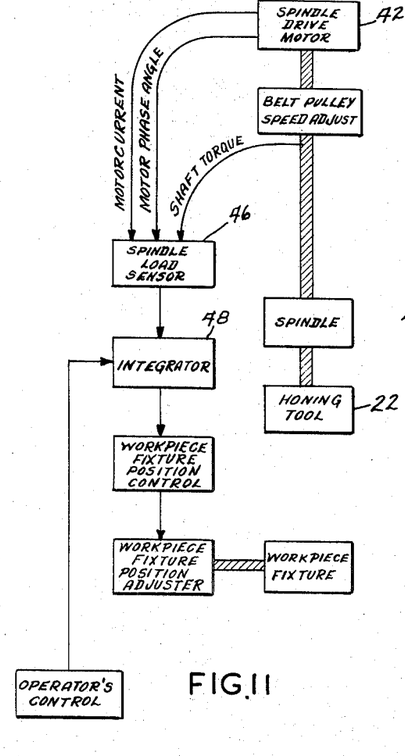
FIG. 11 is a block diagram showing another embodiment of the drive and stroke producing means and of the means for relocating the stroke pattern relative to the work to compensate for imperfections when they are sensed.

The embodiment shown in FIG. 11 is similar in some respects to the device of FIG. 1 in that it includes means for shifting the position of the workpiece rather than the mandrel. In this embodiment either the mandrel or the workpiece can be selected to be the reciprocated member.

Figure 16:
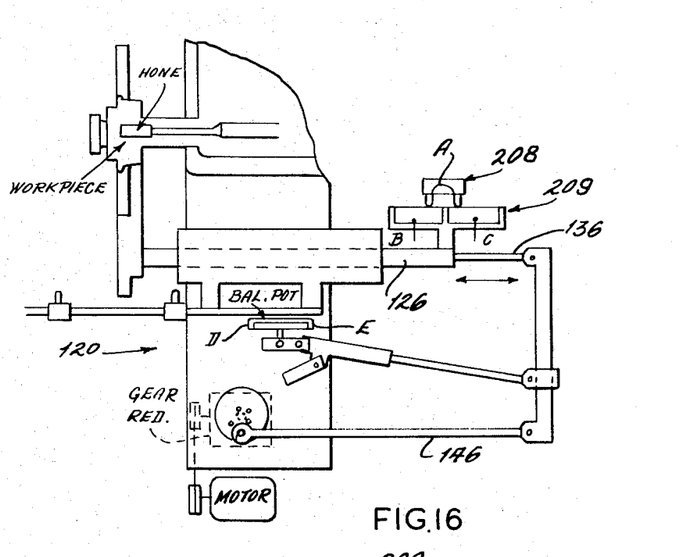
FIG. 16 is a fragmentary view of stroke producing means similar to the means shown in FIG. 12 and including in addition thereto a form of loading sensing means.
Figure 17:
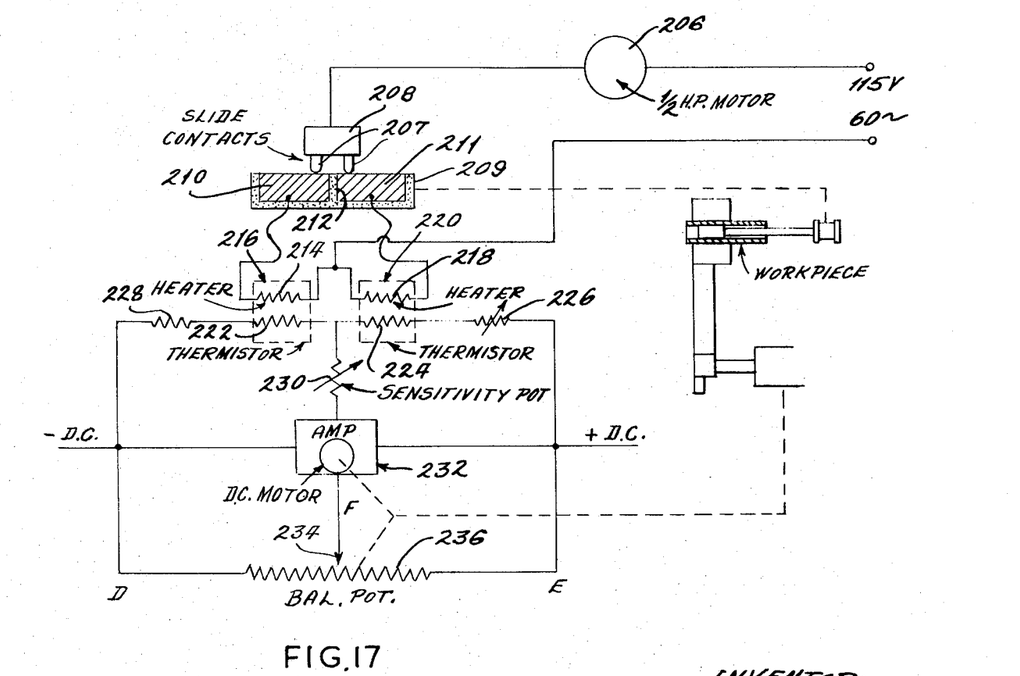
FIG. 17 is a schematic circuit diagram showing a form of automatic load sensing means and means associated therewith to shift the position of relative reciprocation between a reciprocating and a non-reciprocating member in a direction to compensate for variations in the load that are sensed.
Figure 18:
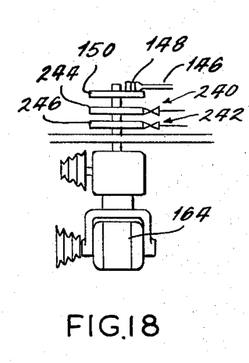
FIG. 18 shows another form of means for use in connection with load sensing means such as the load sensing means shown in FIG. 17.

FIGS. 12–15 show another embodiment 120 of stroke producing means for use on the present machine, and FIGS. 16–18 show means which are part of the load sensing means used to automatically shift or reposition the stroke pattern relative to the workpiece when variations in the load are sensed.

Figures 12, 13:
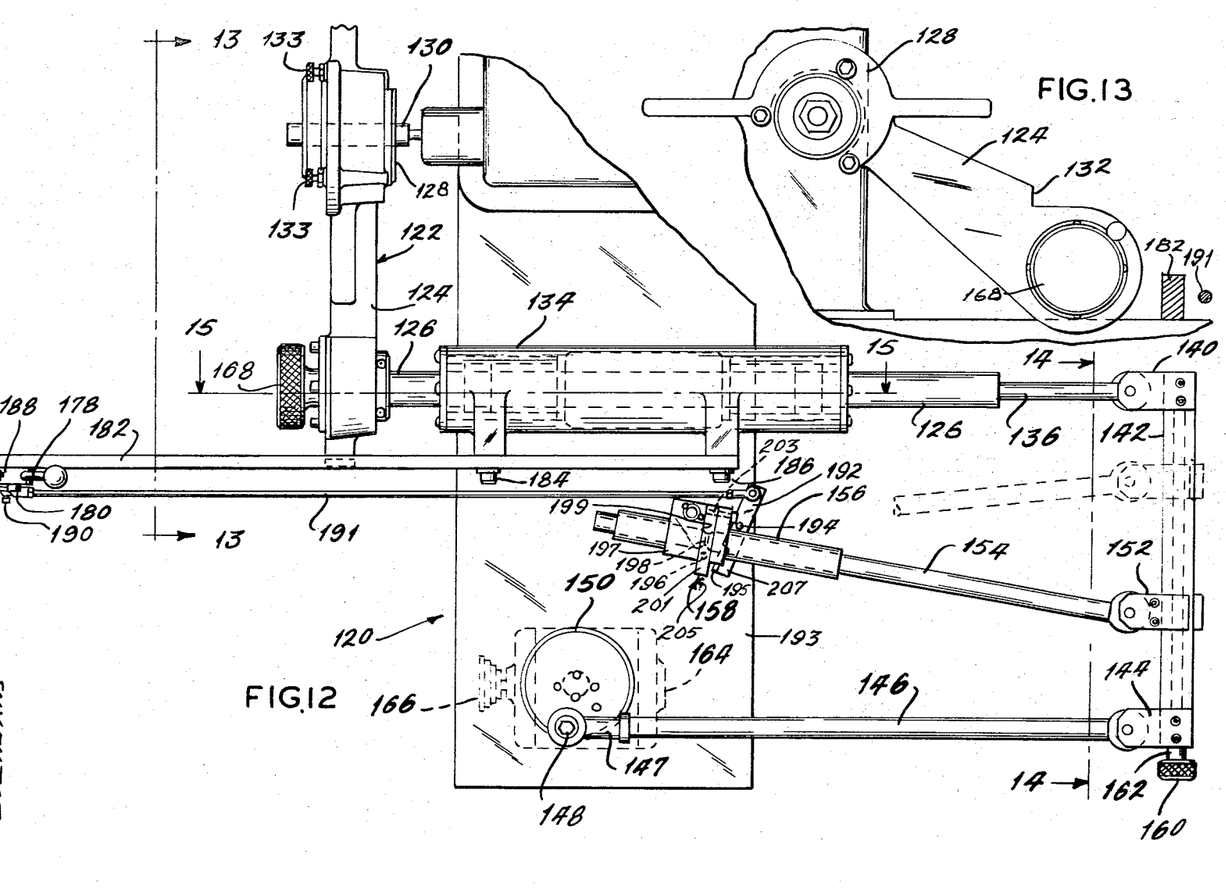
FIG. 12 is a fragmentary top plan view showing one form of stroke producing means for use on a honing or like machine.
FIG. 13 is a view taken on line 13—13 of FIG. 12.

Referring to FIG. 12, the means 120 are shown including a workpiece holder assembly 122 which includes an arm portion 124 mounted on one end of a tubular member 126 for pivotal movement therewith. The holder assembly 122 is movable with the member 126 from a position in which a workpiece located by a holder portion 128 thereof (FIG. 13) is in alignment with honing mandrel 130 to a position in which the workpiece is free of the mandrel for replacement. The holder assembly 122 and the tubular member 126 must also be movable longitudinally relative to the mandrel 130 so that the workpiece can be moved to a position to clear the mandrel during movements thereof. Means including a shoulder 132 are formed on the arm 124 and are provided to limit rotation thereof and to support the arm 124 in its inoperative or storage position. The holder portion 128 also has means 133 which are movable between alternate operating positions to enable installation and removal of the portion 128 and to lock the workpiece in position thereon during a honing operation. The tubular member 126 (FIG. 15) extends through a tubular housing 134 attached to the base of a honing machine, and another member or shaft 136 is positioned extending into the tubular member 126 and out from the rear end thereof where it is pivotally connected to a member 140 mounted on one end of a cross member 142. The opposite end of the cross member 142 has a member 144 which is similar to the member 140, and this member is pivotally connected to the rear end of another shaft 146. The opposite or front end of the shaft 146 has an attached member 147 which is mouned for pivotal movement on a pin or stud 148 which is mounted for movement along a circular path on a rotating crank member 150. When the crank 150 rotates it imparts a reciprocating motion to the shaft 146 and this in turn reciprocates the member 144 and the associated end of the cross member 142.

A member 152 is mounted on the cross member 142 and is movable therealong to adjust the length of strokes to be imparted to the workpiece as will be explained. The adjustable member 152 is pivotally connected to one end of another shaft 154 which has its opposite end extending into a tubular member 156 that is mounted for pivotal movement relative to the base of the machine by means of an assembly 158. A knurled knob 160 is mounted on one end of a shaft 162 which extends longitudinally through the cross member 142. The shaft 162 is journaled at its opposite ends and is threaded along most of its length to cooperate with the stroke length adjustment member 152. When the knob 160 is rotated and rotates the threaded shaft 162 the member 152 moves along the member 142 in a direction determined by the direction in which the knob is turned. In this way, the member 152 can be repositioned along the cross member 142 to relocate the pivot for the end of the shaft 154. As stated, this provides means for changing the length of the strokes imparted by the reciprocating crank 150 to the members 126 and 136. For example, when the member 152 is located near the end of the cross member 142 adjacent to the knurled knob 160, relatively long strokes will be produced while if the member 152 is located nearer the member 140, shorter strokes will be produced.

A motor 164 with a multi-speed pulley 166 is provided for driving the member 150. This is accomplished through suitable gear reducer means (not shown) which are positioned between the motor 164 and the member 150, the gear reducer having a multi-position pulley which has positions corresponding to the positions on the motor pulley 166. Means can also be provided for varying the overall distance between the pivot means at the opposite ends of the shaft 154 although this is usually not necessary because other means are provided as will be explained for varying the combined length of the members 126 and 136. This adjustment serves to locate the position or limits of the stroke motion. The means for varying the overall length of the members 126 and 136 include another knob 168 (FIGS. 12 and 15) which is mounted on a cylindrical member 170 which has an internally threaded portion 172 therein. The threaded portion 172 cooperates with a threaded portion 174 on the shaft 136. It can therefore be seen that when the knob 168 is rotated it also rotates the threaded portion 172, and in so doing moves the non-rotatable member 136 axially relative to the tubular member 126 to increase or decrease the overall length of the combined members 126 and 136. This adjustment is provided to locate the workpiece in the most desirable position relative to the honing mandrel so that when the workpiece is reciprocated it will be moved back and forth about the axial center of the mandrel.

The means disclosed in FIG. 12 also include a crank release lever 178 which is mounted for pivotal movement on a stud 180 located adjacent to the forwardly extending end of a member 182 that is attached to the base of the machine as by threaded members 184 and 186. The crank 178 includes a collar 188 which is mounted on the stud 180 and which has its own pivot stud 190 at the location shown. The forward end of a rod 191 is pivotally attached to the stud 190 and the opposite end of the rod 191 is pivotally connected to adjacent one end of an operator member 192. The member 192 is in turn mounted near its center for pivotal movement on a fixed base plate 193 by another stud 194. The other end of the operator member 192 has a beveled surface portion 195 which cooperates with the lower end of a spring biased pin 196 located in a bore in a block member 197. The block 197 also has a cross-bore therethrough in which the tubular member 156 is fixedly positioned. The shaft 154 extends through the tubular member 156 as aforesaid, and through the block 197, and the shaft 154 has an annular groove 198 formed therein and defined by spaced sloping side walls. A slot 199 is formed in the block 197 and in the tube 156. A movable clutch member 201 is mounted for pivotal movement in the slot 199 by means of a pin 203 located in the block near one end of the slot, and the opposite end of the clutch member 201 is biased downwardly in the slot 199 by means of a spring 205 which is connected at one end to the clutch member 201 and at the opposite end to a pin on the block 197. The pin 196 which cooperates at one end with a beveled surface 195 on the member 192 engages the clutch member 201 at its opposite or upper end. This means that when the lever 178 is moved from one of its two alternate operating positions to the other, the beveled surface 195 on the operator member 192 will move from a position out of engagement with the pin 196 as shown to a position engaging the pin 196 moving it and the clutch member 201 upwardly in the slot 199 and out of engagement with the groove 198 in the shaft 154. This releases the shaft 154 so that it can freely move back and forth in the tube 156 thereby declutching the stroking motion. By the same token, when the lever 178 is in its other operating position the spring 205 will move the clutch member 201 downwardly in the slot 199 into engagement with the shaft 154 so that the next time the groove 198 moves past the slot 199 the clutch member will move into the groove 198 thereby engaging the clutch. Clutch engagement is facilitated by having the opposite walls of the clutch member 201 and of the walls of the groove 198 formed at the same sloping angles as shown. It should be noted also that the operator member 192 has a relatively wide flat cam portion 207 formed thereon adjacent to the beveled surface 195. This is done so that the clutch means can be operated in all possible positions of the connection means 152 on the shaft 154.

Figure 14:
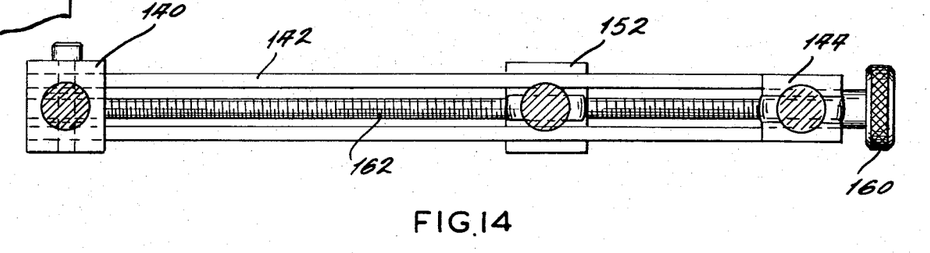
FIG. 14 is an enlarged cross-sectional view taken on line 14—14 of FIG. 12.
Figure 15:
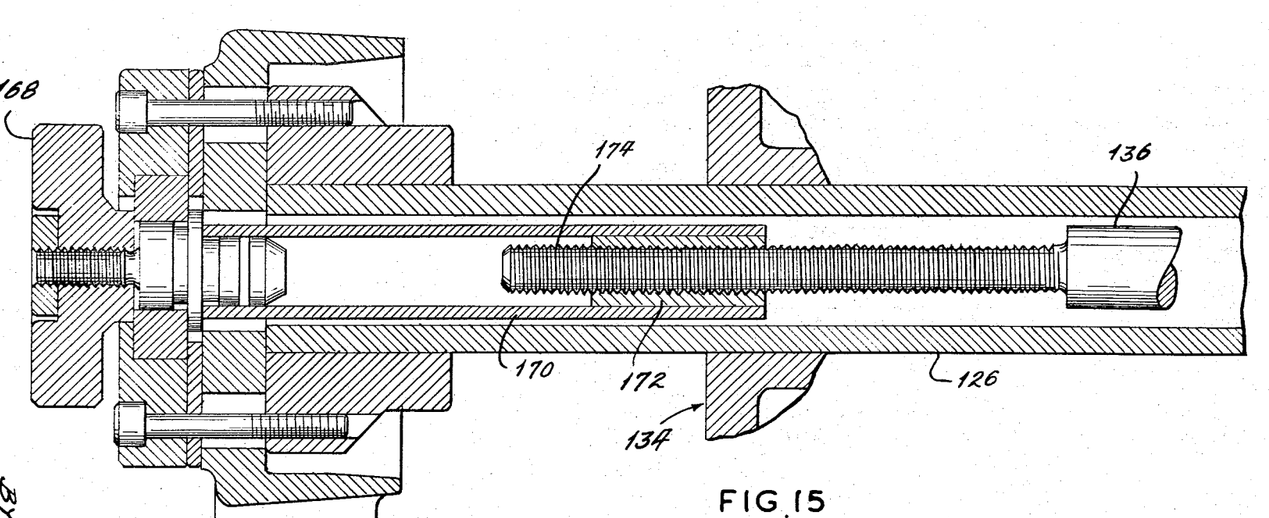
FIG. 15 is an enlarged cross-sectional view taken on line 15—15 of FIG. 12.

FIGS. 16–18 show several other ways to sense variations in the load required to drive the mandrel in a form that can be used to shift the stroke pattern relative to the workpiece in a direction to overcome or correct defects in the work which cause the load on the drive motor to vary. The means disclosed in these figures will be described in connection with the embodiment of the device that is shown in FIGS. 12–14. In FIGS. 16 and 17 the parts of the machine as shown are identified by the same numbers that the corresponding parts have in FIGS. 12–15.

Referring first to FIG. 17, the mandrel drive motor 206 is shown connected in a power circuit in series with a slide contact assembly and heater devices which will be described. In this embodiment, the motor current flows through the motor and through a pair of spaced slide contacts 207 which are mounted in a stationary slide assembly 208. The assembly 208 in this particular embodiment is maintained in a fixed position, and the contacts 207 thereof slideably engage the upper surface of a reciprocating commutator member 209 which is connected for movement with the reciprocating member which in FIG. 17 is shown as the workpiece although it could as well be the mandrel. The reciprocating commutator 209 has a pair of spaced conductor portions 210 and 211 which are slideably engaged by the contacts 207 during the reciprocating movements, and the two conductor portions 210 and 211 are insulated from each other by a non-conductive portion 212 which is narrower than the distance between the contacts 207. This means that in all positions of the commutator 209, one or both of the two contacts 207 will be in engagement with one or both of the conductor portions 210 and 211 so that motor current will always be available. Also during part of each cycle both of the contacts 207 will be engaged with the same conductor 210 and during a different part with the conductor 211. Hence at all times a circuit will be provided to maintain the motor 206 in an operating condition.

The conductor portion 210 is electrically connected to one side of a heater element 214 which is part of a thermistor device 216, and the opposite side of the element 214 is connected to the opposite side of the power input for the motor 206. In like manner, the conductor portion 211 is connected to one side of a heater element 218 in another thermistor 220, and its opposite side is also connected to the other side of the power source. It is now apparent that when both of the contacts 207 of the assembly 208 are in engagement with the conductor portion 210 all of the motor current will flow through the thermistor heater element 214, and when both of the contacts 207 are engaged with the conductor portion 211 all of the motor current will flow through the heater element 218. By the same token when the assembly is centered on the assembly 209 current will flow equally through both of the contacts 207 and through the respective commutator conductor portions 210 and 211 and heater elements 214 and 218. This means that as the commutator 209 moves back and forth during a stroking operation, both of the contacts 207 at different times will be in contact with the same one of the conductor portions 210 and 211, and during these times only one of the heater elements will be passing current. The contacts 207 should, however, be centered relative to movements of the commutator 209 at all times regardless of whether the stroke pattern has been shifted relative to the work so that the contacts 207 will engage the conductor 210 for the same length of time it engages conductor 211 during each full cycle of operation.

When a surface being honed is smaller in diameter at one end than the other, current drawn by the motor will be greater when honing at the smaller diameter end of the surface and hence more current will flow through the heater element associated with the smaller diameter end of the workpiece surface than through the other heater element. This means that the heater element of the thermistor having the greater current flow will heat up more than the heater associated with the other thermistor thus raising its temperature more than the temperature of the other thermistor. The thermistors 216 and 220 also have other heat sensitive elements 222 and 224 respective, and it is a characteristic of thermistors such as those described that the resistance (or impedance) of the elements 222 and 224 will decrease as their temperature increases due to increased current flowing through the associated heater elements. Therefore, if the thermistor 216 becomes hotter than the thermistor 220, the resistance of the element 222 will decrease relative to the resistance of the element 224.

In the construction shown in FIG. 17, the thermistor elements 222 and 224 are connected in series in a voltage divider network which includes an adjustable calibration resistor 226 and a fixed resistor 228. This circuit is connected across a D.C. source between terminals labeled +D.C. and —D.C. With no load, or a constant load, on the main drive motor 206 the calibration resistor 226 is adjusted until the combined resistance of the resistor 228 and the element 222 is the same as the combined resistance of the element 224 and the adjustable resistor 226. This means that when the D.C. potential is applied across the voltage divider network, the common connection between the thermistor elements 222 and 224 will be at or near zero potential. This common point is connected to another adjustable resistor 230 which is identified in the drawing as the sensitivity POT., and the opposite side of the sensitivity POT. 230 is connected to one side of a D.C. motor and amplifier means 232. Power is supplied to the motor and amplifier means 232 through other connections to the +D.C. and —D.C. terminals, which terminals may receive their energy from the same power source as the power source that supplies the drive motor 206 but through appropriate rectifier means (not shown).

The motor-amplifier means 232 also have a connection to a movable contact 234 of another potentiometer 236 which has its opposite ends connected respectively to the +D.C. and —D.C. terminals. The potentiometer 236 is included for balancing purposes. When the bridge circuit is balanced, no current will flow through the sensitivity potentiometer 230 to the D.C. motor and amplifier means 232. Under these circumstances no correction is called for and the stroking pattern will not be shifted relative to the workpiece. However, when the bridge including the thermistors 216 and 220 are in an unbalanced condition as indicated by one of the heater elements 214 or 218 passing more current than the other, current will flow through the sensitivity potentiometer 230 to the D.C. motor and amplifier means 232, and the motor will be driven in an appropriate direction depending on which heater element is passing greater current. When this happens, the motor 232 will operate to move the movable contact 234 of the balancing potentiometer 236 until the bridge circuit is restored to a balanced condition. At the same time, the motor 232 will also move the workpiece (or the mandrel) to relocate the stroke pattern relative to the workpiece. This can be accomplished in a number of different ways including rotating the shaft 55 on which the crank handle 54 is located as shown in FIGS. 1 and 2 or by rotating the knob 168 in FIG. 12. It is important to note, however, that shifting the workpiece or the mandrel does not and should not change the centered relationship of the contacts 207 on the commutator 209 since the contacts should always be in contact with the conductor portions 210 and 211 for the same length of time in each operating cycle.

As the taper or other imperfection of the workpiece is removed the load on the main drive motor will become more uniform, and this will cause the heater elements 214 and 218 to again receive approximately the same amount of current during each operating cycle of the commutator 209, and as this occurs it will result in a gradual return to the original balanced condition of the bridge, and this will cause the motor 232 to return to its neutral condition. This will also restore the stroke pattern to a centered condition relative to the workpiece in the same manner described above for shifting the stroke pattern manually.

It can therefore be seen that the sensing means disclosed in FIG. 17 are able to sense an imperfect or tapered condition in a bore as it is being honed and provide an output response which is used to move the workpiece (or the honing mandrel regardless of which is being reciprocated) to reposition the reciprocating pattern relative to the mandrel. This is also done at a rate which depends upon the severity of the imperfection, and the correction will gradually operate to move the stroke pattern back to its centered condition on the workpiece as the imperfection is eliminated. Also the device of FIG. 17 is able to automatically adjust for different average load conditions and the device is able to accomplish adjustment quickly or gradually over a period of cycles which makes it particularly useful when honing relatively short length bores.

The embodiment shown in FIG. 16 is similar to the embodiment of FIG. 17 but slightly modified by having the commutator means connected directly to be reciprocated by the connected members 126 and 136. In this case, it is important to provide means to maintain the contact assembly 208 in a centered position with respect to the commutator 209 when the stroke pattern has been shifted away from its centered position on the workpiece. Such a construction would require cam or other equivalent means for maintaining this relationship. The construction of FIG. 16 can be somewhat further simplified by attaching the movable commutator to the rod 146 instead of having it move with the members 126 and 136 as shown. If this were done it would eliminate the need for special cams and other associated linkages.

Another simplified embodiment for the commutator means of FIGS. 16 and 17 is shown in FIG. 18 wherein the movable contacts and commutator means are replaced by two cam operated switches 240 and 242 mounted on the same shaft with the rotating crank member 150, see FIG. 12. In this case, the two switches 240 and 242 are adjusted or timed to be closed during certain portions of each cycle of operation and open at other times. It is also important that the switches be closed simultaneously during part of each cycle so there will always be a circuit to provide power for operating the drive motor 206. The switches 240 and 242 are shown in FIG. 18 being operated by associated cams 244 and 246 mounted on the same shaft with the member 150. The contacts of the switches are connected into the power circuit of the motor 206 in a manner similar to the contacts 207 and the commutator 209 of FIG. 17, and the bridge fed by the switches can be similar to the bridge circuit described above.

Thus there has been shown and described novel means for manually or automatically correcting imperfections that are sensed in a surface during relative reciprocating motion between the surface and a working member such as in a honing device or the like by providing means for sensing and/or indicating imperfections, and means for shifting the position of the reciprocating work pattern relative to the surface in a direction to remove the imperfections by satisfying the sensing means in some respect. This is accomplished by providing load sensing and indicating means which can be observed by the operator and used for making manual corrections, or by means which sense load changes on the working member during its stroking movements and produce outputs which operate means that automatically shift the stroke pattern in a direction to remove the imperfection and thereafter restore normal operation. The several different embodiments disclosed herein accomplish the same desirable results, namely, the production of more nearly perfectly formed or honed surfaces, and they accomplish this with a minimum of operator attention in some cases manually and in others completely automatically, which means fulfill all of the objects and advantages sought therefor. It will be apparent, however, to those skilled in the art that many changes could be made in the embodiments disclosed without departing from the spirit and scope of the invention including using other forms of electrical and mechanical load sensing devices, other forms of electrical and mechanical means for shifting the stroke pattern relative to the work, and so on. All such changes, including variations, modifications, and adaptations thereof which do not depart from the spirit and scope of the invention are deemed to be covered by the invention which is limited only by the claims which follow.

I claim:

1. In a honing machine for honing cylindrical surfaces in workpieces having a mandrel engageable with the workpiece surface, means for rotating the mandrel, and means for establishing a pattern of reciprocating motion between the mandrel and the workpiece surface so that the mandrel will hone all portions of the workpiece surface, the improvement comprising means responsive continuously to the load on the mandrel in all positions thereof including means for producing an output indicative of said load, and other means including means movable in response to increases in the outputs of the load responsive means for shifting the position of the pattern of reciprocating motion between the workpiece surface and the mandrel in a direction to shift the pattern of reciprocation of the mandrel relative to the workpiece surface in the direction to where it is sensed that greater load is required to rotate the mandrel.

2. In the honing machine of claim 1, said means for rotating the mandrel include motor means, said means continuously responsive to the load on the mandrel include means responsive to the motor current required to rotate the mandrel, and said means for shifting the position of the pattern of reciprocating motion include manual means.

3. In the honing machine of claim 1, said means for rotating the mandrel include motor means, said means continuously responsive to the load on the mandrel include a bridge circuit having input connections connected to the motor means and output connections, and means responsive to signals generated at the bridge output connections for shifting the position of the pattern of the reciprocating motion.

4. Means on a honing machine for correcting imperfections in a workpiece surface being honed comprising a honing machine including a mandrel for honing workpiece surfaces, means for rotating the mandrel while engaged with the workpiece surface, other means for producing a reciprocating motion between the rotating mandrel and the workpiece whereby the mandrel hones all portions of the workpiece surface, means for continuously monitoring the energy required by the mandrel rotating means to rotate the mandrel including means to produce an output indicative of said energy, and means for shifting the position of the reciprocating motion of said mandrel relative to the workpiece surface in a direction such that the mandrel will hone portions of the workpiece surface where greater energy is required more than other portions of the workpiece surface.

5. The means for correcting imperfections in workpieces being honed defined in claim 4 wherein said means for shifting the position of the reciprocating motion of said mandrel relative to the workpiece surface include means for moving the workpiece.

6. The means for correcting imperfections in workpieces being honed defined in claim 4 wherein said means for shifting the position of the reciprocating motion of said mandrel relative to the workpiece surface include means for moving the mandrel.

7. The means for correcting imperfections in workpieces being honed defined in claim 4 wherein the reciprocating motion of the mandrel relative to the workpiece surface is substantially axially centered on the workpiece surface whenever the energy required to rotate the mandrel is substantially non-varying.

8. In a machine for honing substantially cylindrical surfaces in workpieces, said machine including a honing mandrel, means for rotating the honing mandrel while the mandrel is engaged with the workpiece surface, other means for establishing a stroke pattern of axially reciprocating motion between the rotating mandrel and the workpiece surface whereby the mandrel repeatedly hones all portions of the cylindrical workpiece surface, means for continuously sensing the energy required by the mandrel rotating means to rotate the mandrel in all positions thereof relative to the workpiece surface being honed, and means adjustable to shift the position of the stroke pattern relative to the workpiece surface in a direction to correct imperfections in the workpiece surface as indicated by increases in the energy required to rotate the mandrel when the mandrel is honing certain portions of the workpiece surface relative to when it is honing other portions thereof, the pattern of reciprocating motion and the speed of mandrel rotation being relatively unaffected by shifts in the position of the stroke pattern.

9. In the honing machine defined in claim 8, said means adjustable to shift the position of the stroke pattern include manual adjustment means.

10. In the honing machine defined in claim 8, said means adjustable to shift the position of the stroke pattern include a bridge circuit, and means for balancing the bridge circuit when the position of the stroke pattern is centered axially in the workpiece surface being honed.

11. In the honing machine defined in claim 8, said means for rotating the mandrel include an electric motor and a source of energy connected thereto, said energy sensing means including commutator means connected into the circuit between the energy source and the motor means, said commutator means establishing alternate circuit paths for carrying the motor current during different but equal length portions of each cycle of the stroke pattern.

12. In the honing machine defined in claim 11, a bridge circuit having a first portion responsive to the motor current during one of said different but equal length portions of each cycle of the stroke pattern, a second portion of the bridge circuit responsive to the motor current during another of said different but equal length portions of each cycle of the stroke pattern, said means adjustable to shift the position of the stroke pattern including means responsive to differences between the responses of said first and second bridge circuit portions.

13. In the honing machine defined in claim 8, said means for rotating the mandrel include an electric motor and a source of energy connected thereto, said energy sensing means including timed switch means having connections in the circuit between the energy source and the electric motor, said timed switch means including two sets of contacts timed and controlled by said other means that establish the stroke pattern, each of said two sets of contacts being connected to carry motor current during a different predetermined portion of each cycle of the stroke pattern.

14. In the honing machine defined in claim 13, an electric bridge circuit having a first portion connected to respond to the motor current carried by one set of contacts of said timed switch means, a second bridge circuit portion connected to respond to the motor current carried by the other set of contacts of the timed switch means, said means adjustable to shift the position of the stroke pattern including means responsive to differences between the current carried by the first and second sets of contacts of said timed switch means.

15. In a machine for honing surfaces on workpieces to a true cylindrical shape, said machine including a mandrel having workpiece surface engaging portions thereon, and means for rotating the mandrel and for simultaneously generating a repeating pattern of relative axial reciprocating movement between the mandrel and the workpiece surface being honed thereby so that the mandrel will hone all portions of the workpiece surface, the improvement comprising means for determining the presence of variations from a true cylindrical shape of the workpiece surface by means that continuously respond to the energy required to rotate the mandrel, and other means for axially shifting the position of one of the relatively axially movable members in a direction to remove the said surface variations, said last named means including means to relocate the repeating pattern of relative axial reciprocating movement in a direction towards where the greater energy is required to rotate the mandrel.

References Cited

UNITED STATES PATENTS

| | | | |
|---|---|---|---|
| 2,108,029 | 2/1938 | Connor | 51—34 K X |
| 2,831,297 | 4/1958 | Skran | 51—338 X |
| 3,030,740 | 4/1962 | Greening | 51—34 R |
| 3,247,622 | 4/1966 | Hackman | 51—34 H X |
| 3,287,860 | 11/1966 | Blake | 51—34 H X |
| 3,393,472 | 7/1968 | Sunnen | 51—34 H |
| 3,451,175 | 6/1969 | Sunnen et al. | 51—34 R X |

LESTER M. SWINGLE, Primary Examiner

U.S. Cl. X.R.

51—34 R, 92 R